March 8, 1932.    L. D. BARNER    1,848,406
GATE VALVE MECHANISM
Filed Feb. 17, 1930    2 Sheets-Sheet 1

Inventor
Lawrence D. Barner
By Hardway Cather
Attorneys

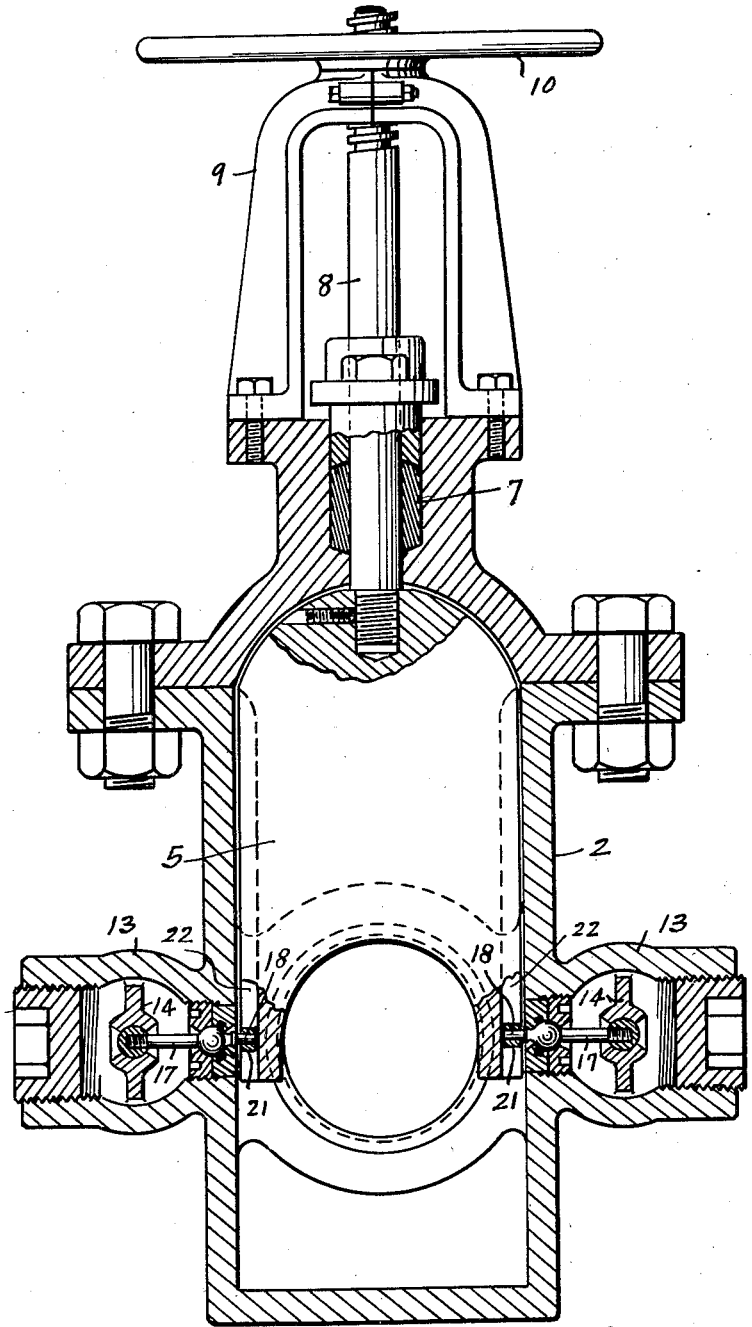

Patented Mar. 8, 1932

1,848,406

UNITED STATES PATENT OFFICE

LAWRENCE D. BARNER, OF BEAUMONT, TEXAS

GATE VALVE MECHANISM

Application filed February 17, 1930. Serial No. 429,010.

This invention relates to new and useful improvements in a gate valve mechanism.

One object of the invention is to provide a gate valve mechanism equipped with means for balancing the valve thereof, when said valve is in closed position.

As at present constructed the valve controlling a pressure line, when closed, is seated, by the pressure in the line, firmly against the opposing seat and the friction of said valve against said seat makes it very difficult to open the valve. It is the prime object of this invention to provide means, in a valve mechanism, of the character referred to, through which the pressure in the line may act to balance the valve when the valve is closed so as to eliminate, or reduce, the friction of the valve with its seat to the end that the valve may be easily opened.

With the above and other objects in view this invention has particular relation to certain novel features of construction, operation and arrangement of parts an example of which is given in this specification and illustrated in the accompanying drawings wherein:—

Figure 3 shows a transverse sectional view, showing the valve open.

Figure 1:
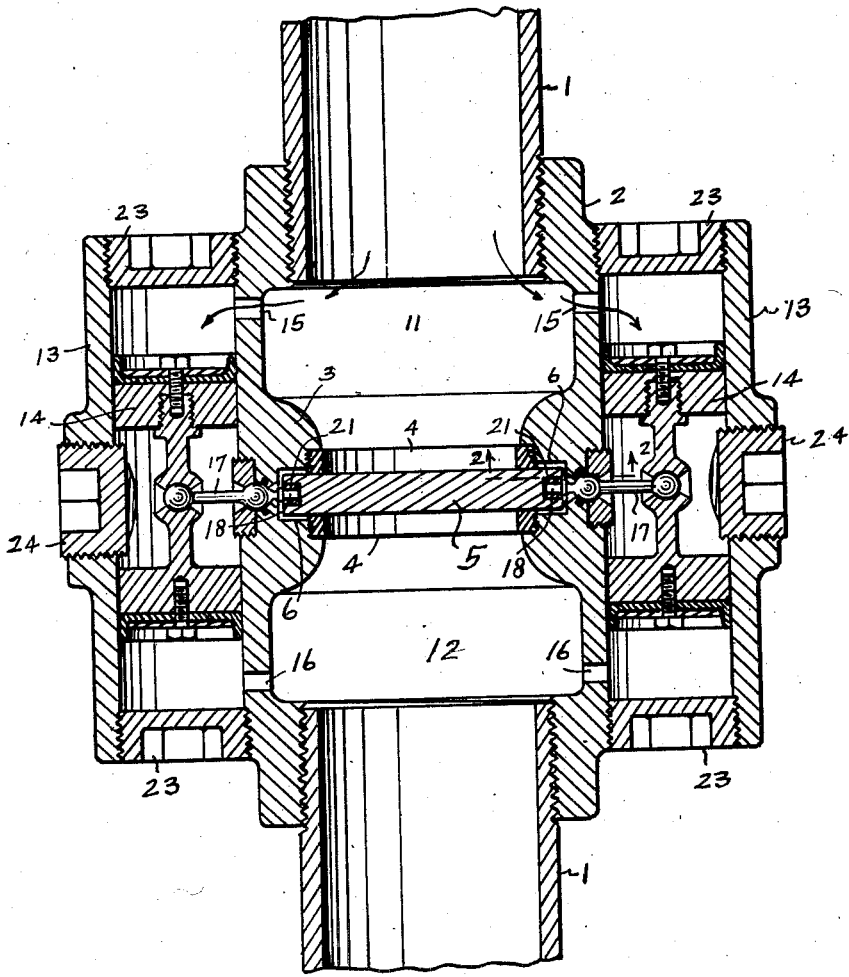
Figure 1 shows a longitudinal sectional view of the mechanism, showing the valve closed.
Figure 2:
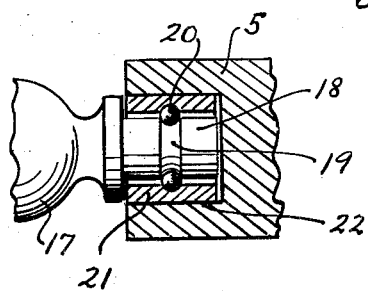
Figure 2 shows an enlarged fragmentary sectional view taken on the line 2—2 of Figure 1.

Referring now more particularly to the drawings, the numeral 1 designates a flow line for fluid under pressure incorporated into which there is a valve casing 2. The fluid channel through the casing, aligned with the flow line 1, is contracted by the inside annular rib 3 therearound and is surrounded by the spaced annular valve seats 4, 4 which are anchored in said rib. There is a slidable gate valve 5 mounted in the casing to move between said seats and the oppositely disposed side margins of this valve moves in the inside confronting side channels in the casing aligned with said valve. One end of the valve casing has a stuffing box 7 through which the valve stem 8 works. The inner end of this stem is connected to the valve 5 and its outer end works through a bearing in the outer end of the yoke 9 and is coarsely threaded. The operating hand wheel 10 is threaded onto said outer end of the stem 8 and works against the outer end of the yoke 9. The free end of the valve 5 is arcuate as shown in Figure 3 so that when the valve is moved into open position said arcuate end will clear the fluid passageway through the casing and when moved to closed position said passageway will be completely closed. The valve when closed separates the casing into two similar chambers 11, 12. On opposite sides of the casing are the longitudinally disposed cylinders 13, 13 in which are mounted the double acting plungers 14, 14. Leading from the chamber 11 into the cylinders on one side of their respective plungers are the ports 15, 15, and leading from the chamber 12 into said cylinders on the other side of said plungers are the ports 16, 16. There are the balancing levers 17, 17 whose outer ends have universal connections with the respective plungers 14 and whose inner ends are mounted in universal bearings in the corresponding sides of the casing and extending inwardly from these respective levers are the pintles 18, 18. Each pintle has an annular bearing raceway 19 therearound, in which are the antifriction bearings 20 which are retained in place by the rollers 21. These rollers run in the marginal grooves 22, 22 in the side margins of the valve 5.

Assuming that the fluid is flowing under pressure in the direction indicated by the arrows, in Figure 1, should the valve 5 be now closed, the pressure of the fluid will be exerted against said valve 5 and this pressure would normally tend to seat the valve tightly against the opposing seat 4. However the pressure will be diverted through the ports 15, 15 and against the plungers 14, 14. The combined area of the ends of the plungers exposed to the pressure is proportioned to the total area of the valve exposed to said pressure so that the pressure exerted against the plungers will be transmitted through the levers 17 and will operate to balance the valve 5 between said pressures. The valve may then be readily opened as there will be substantially no friction between the valve and the seat 4 opposite the pressure chamber 11. Without this balancing arrangement the friction of the valve against the opposing seat, when the valve is closed, particularly when the fluid is under high pressure, would make the valve very difficult to open.

The cylinders 13 have the removable end plugs 23, 23 and the removable side plugs 24 which may be removed to gain access to the interior thereof for assembly or repairs.

The drawings and description disclose what is now considered to be a preferred form of the invention by way of illustration only while the broad principle of the invention will be defined by the appended claims.

What I claim is:—

1. A gate valve mechanism for controlling fluid flowing, under pressure, through a conduit, including a valve casing incorporated into the conduit, a valve in the casing movable into active position to close said conduit, and movable into inactive position to open said conduit, and means operable by the pressure of the fluid and effective to balance the fluid pressure against said valve when the valve is closed.

2. A gate valve mechanism for controlling fluid flowing under pressure through a conduit, and including a valve casing, a valve seat around the conduit in the casing, a valve in the casing movable into active position into cooperative relation with said seat to close said conduit, and movable into inactive position to open said conduit, said valve, when closed being exposed to the pressure of the fluid which tends to seat said valve against said seat, and means operable by the pressure of said fluid, when the valve is closed, and effective to counteract the effect of the pressure of said fluid against the valve.

3. A gate valve mechanism for controlling fluid flowing under pressure through a conduit, and including a valve casing, a valve seat around the conduit in the casing, a valve in the casing movable into active position into cooperating relation with said seat to close said conduit, and movable into inactive position to open said conduit, said valve, when closed being exposed to the pressure fluid which tends to seat said valve against said seat, and means operable by the pressure of said fluid, when the valve is closed and effective to counteract the effect of the pressure of said fluid against the valve, said means comprising a movable member operatively connected with said valve and exposed to the pressure of the fluid in said conduit.

4. A gate valve mechanism for controlling fluid flowing, under pressure, through a conduit, including a valve casing incorporated into the conduit, a valve in the casing movable into active position to close said conduit, and movable into inactive position to open said conduit, and means operable by the pressure of the fluid and effective to balance the fluid pressure against said valve when the valve is closed, said means including a movable member operatively connected with the valve and exposed to the pressure of the fluid in said conduit.

5. A gate valve mechanism including a valve casing having a fluid passageway therethrough, a valve in the casing movable into active position to close said passageway and into inactive position to open said passageway, means operable by the pressure of the fluid when the valve is closed, and effective to counteract such pressure against the valve.

6. A gate valve mechanism including a valve casing having a fluid passageway therethrough, a valve in the casing movable into active position to close said passageway and into inactive position to open said passageway, means operable by the pressure of the fluid when the valve is closed, and effective to counteract such pressure against the valve, said means including a movable member operatively connected with the valve and exposed to the pressure of said fluid.

7. A gate valve mechanism including a valve casing having a fluid passageway therethrough, a valve in the casing movable into active position to close said passageway and into inactive position to open said passageway, means operable by the pressure of the fluid when the valve is closed, and effective to counteract such pressure against the valve, said means including a cylinder, a plunger therein exposed to the pressure of the fluid and operatively connected with said valve.

8. A gate valve mechanism including a valve casing having a fluid passageway therethrough, a valve in the casing movable into active position to close said passageway and into inactive position to open said passageway, means operable by the pressure of the fluid, when the valve is closed, and effective to counteract such pressure against the valve, said means including a pair of cylinders, a plunger in each cylinder exposed to the pressure of said fluid, and means operatively connecting the respective plungers with the valve.

In testimony whereof I have signed my name.

LAWRENCE D. BARNER.